SENSING MEANS FOR A MAGNETIC MEMORY SYSTEM

Original Filed March 26, 1963 6 Sheets-Sheet 1

INVENTOR
DONAL A. MEIER

BY Louis A. Kline
John J. Matlago
Nathan Cass
HIS ATTORNEYS

SENSING MEANS FOR A MAGNETIC MEMORY SYSTEM

Original Filed March 26, 1963 6 Sheets-Sheet 2

INVENTOR
DONAL A. MEIER

BY Louis A. Kline
John J. Matlago
Nathan Cass
HIS ATTORNEYS

INVENTOR
DONAL A. MEIER

BY Louis A. Kline
John J. Matlago
Nathan Cass
HIS ATTORNEYS

SENSING MEANS FOR A MAGNETIC MEMORY SYSTEM

Original Filed March 26, 1963 6 Sheets-Sheet 4

INVENTOR
DONAL A. MEIER

BY Louis A. Kline
John J. Matlago
Nathan Cass
HIS ATTORNEYS

INVENTOR
DONAL A. MEIER

BY Louis A. Kline
John J. Matlago
Nathan Cass
HIS ATTORNEYS

INVENTOR
DONAL A. MEIER

BY Louis A. Kline
John J. Matlago
Nathan Cass
HIS ATTORNEYS

3,478,338
SENSING MEANS FOR A MAGNETIC MEMORY SYSTEM

Donal A. Meier, Inglewood, Calif., assignor to The National Cash Register Company, Dayton, Ohio, a corporation of Maryland Original application Mar. 26, 1963, Ser. No. 268,145, now Patent No. 3,341,829, dated Sept. 12, 1967. Divided and this application May 25, 1967, Ser. No. 641,372
Int. Cl. G11b 5/00
U.S. Cl. 340—174 16 Claims

ABSTRACT OF THE DISCLOSURE

A bistable magnetic memory system connected in a common mode read-out sensing arrangement and including a sense amplifier input circuit having a diode bridge circuit for overcoming unbalancing because of different information patterns of the stored data. The sense amplifier input circuit also includes inductively restored, pedestal-gated, tunnel rectifier discriminating elements providing high stability for sensing, while preventing sense amplifier overloading during writing, and permitting a high degree of partitioning of the sense-digit lines coupling the magnetic elements of the system.

This patent application is a division of patent application Ser. No. 268,145, filed Mar. 26, 1963, now Patent No. 3,341,829 for Computer Memory System, Donal A. Meier, inventor.

The present invention relates generally to digital computer memory systems, and more particularly to an improved sensing system for a bistable memory.

With the ever increasing use of digital computers in science and industry, considerable attention has been directed towards providing improved memory systems for use therewith. An important feature of a memory system relates to its speed of operation, particularly in view of the efforts which have been directed toward increasing the speed of computer operation as much as possible. Accordingly, it is an object of the present invention to provide sensing system for a memory which permits high speed operation of the memory.

Particularly difficult problems with regard to memory systems arise because of unwanted noise which interferes with the reliable sensing of signal information and often prevents achieving high speed operation and/or a high packing density. Such noise may result from the coupling of energy between adjacent memory bits, or may result because of the changing pattern of signal information. In any case, noise must be taken into account in the design of a memory system and, accordingly, it is another object of the present invention to provide a sensing system for a memory which advantageously handle the noise problem.

The manner in which the above objects may be provided in accordance with the present invention will be illustrated with respect to a particular memory embodiment employing bistable memory elements comprised of thin film rods having solenoidal windings thereon, as disclosed, for example, in the commonly assigned patent applications Ser. No. 795,934, filed Feb. 27, 1959, now Patent No. 3,228,012, and Ser. No. 77,451, filed Dec. 21, 1960, now Patent No. 3,213,431. It is to be understood that although the features of the present invention are of particular advantage when used in a thin film rod memory as disclosed in said applications, all of the features are not restricted to such use, and various features of the invention may also be used to advantage in other types of embodiments.

The specific nature of the invention, as well as other objects, uses and advantages thereof will become apparent from the following description of a typical embodiment of a thin film rod memory embodying the invention and illustrated in the accompanying drawings in which.

Figures 1, 2:
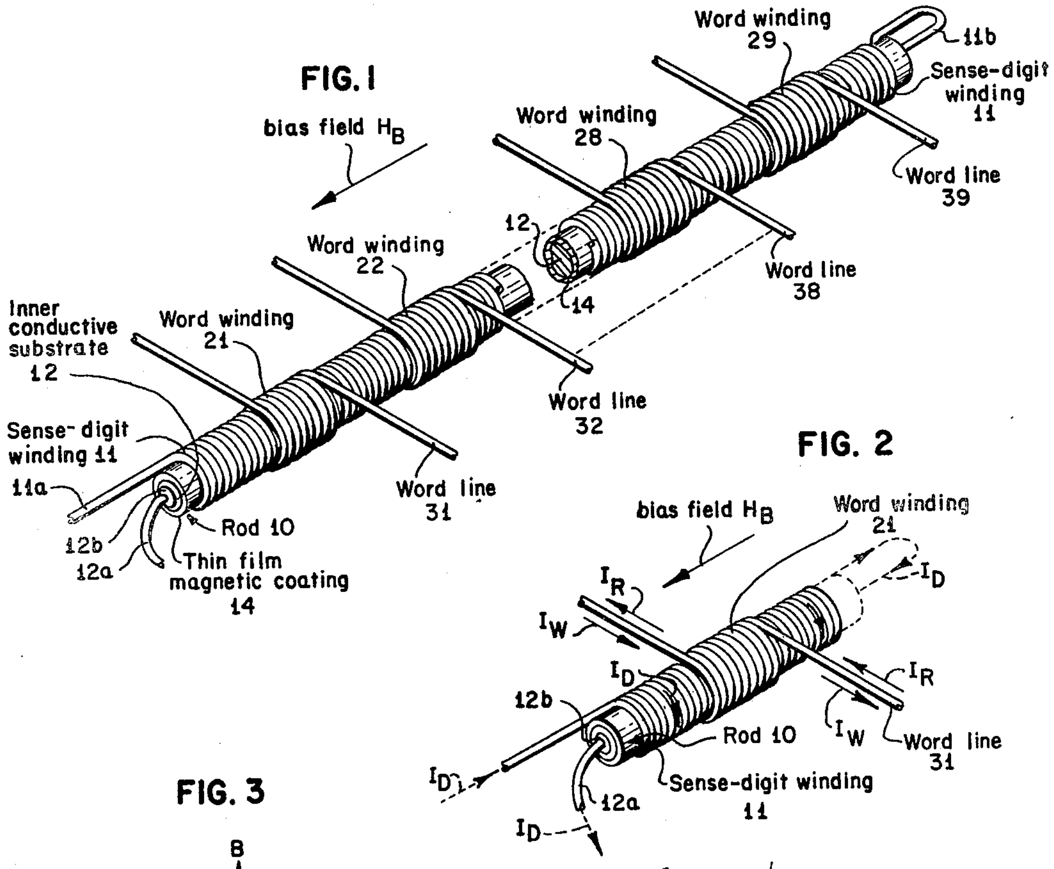
FIG. 1 is a perspective view, partially broken away, of a typical thin film rod and its associated windings.
FIG. 2 is a perspective view of a portion of FIG. 1 and will be used in describing the mode of operation of a basic magnetic element.

Referring first to FIGS. 1 and 2, the basic thin film rod 10 and its associated windings are illustrated. A plurality of such rods are arranged in a three dimensional matrix to form the thin film rod memory which will be used to exemplify the features of the present invention. As shown in FIG. 1, the rod 10 is comprised of an inner conductive substrate 12 on which is provided a thin film magnetic coating 14. Typically, the substrate 12 may be a beryllium copper rod of about 0.010 inch in diameter. The thin film magnetic coating 14 may typically comprise a bilayer magnetic film of the type disclosed in the aforementioned copending commonly assigned patent application Ser. No. 77,451, now Patent No. 3,213,431 namely, a first adherent iron-nickel layer electrodeposited on the beryllium copper rod and composed of from about 30% to about 90% nickel and from about 70% to 10% iron, and a second adherent iron-nickel layer electro-deposited on the first layer and composed of from about 93% to 99% iron and from about 7% to 1% of nickel, the composite thickness typically ranging from about 2,000 to 8,000 angstroms, but in any case, preferably less than 10,000 angstroms. Such a composite bilayer magnetic film has a substantially rectangular hysteresis characteristic and may typically have a coercive force of about 8 oersted, an anisotropy field of about 12 oersted, and a switching time of approximately 25 nanoseconds (that is, $25\times10^{-9}$ seconds). Also, the first adherent iron-nickel layer preferably has a uniaxial oriented easy direction.

Still referring to the basic rod of FIG. 1, it will be seen that the various windings associated with the rod 10 are as follows: (1) a sense-digit winding 11 wound along the length of the rod and, as will be explained hereinafter, serves as both a sense and a digit winding, and (2) a plurality of nine spaced word windings 21, 22–28, and 29 wound over the sense-digit winding 11 and capable of receiving applied currents by way of respective word lines 31, 32–38 and 39.

As also indicated in FIG. 1, the lead **11*b* at the free end of the sense-digit winding 11 nearest the back of the rod (as viewed in FIG. 1) is connected (such as by soldering) to the back of the inner conductive substrate 12 so as to connect the sense-digit winding 11 and the substrate 12 in series. Similarly, the front of substrate 12 has a wire 12*a* soldered thereto at typical solder joint 12*b*, the wire 12*a* being provided to permit the series-connected digit-sense winding 11 and substrate 12 to be connected to the series-connected digit-sense winding and substrate of other rods in the matrix. From the above, it should be evident that a current applied to lead 11*a* at the free end of the sense-digit winding 11 nearest the front of rod 10 will flow through the sense-digit winding 11 wound along rod 10, through the lead 11*b* at the back end of the rod 10, then through the conductive substrate 12 in the opposite direction, until the current appears at the front end of substrate 12, where it will then flow by way of lead 12*a* to other series-connected sense-digit windings and substrates in the matrix. The advantages of connecting the sense-digit winding 11 to the inner substrate 12** will be considered further on in this description when the mode of operation is considered.

Figure 3:
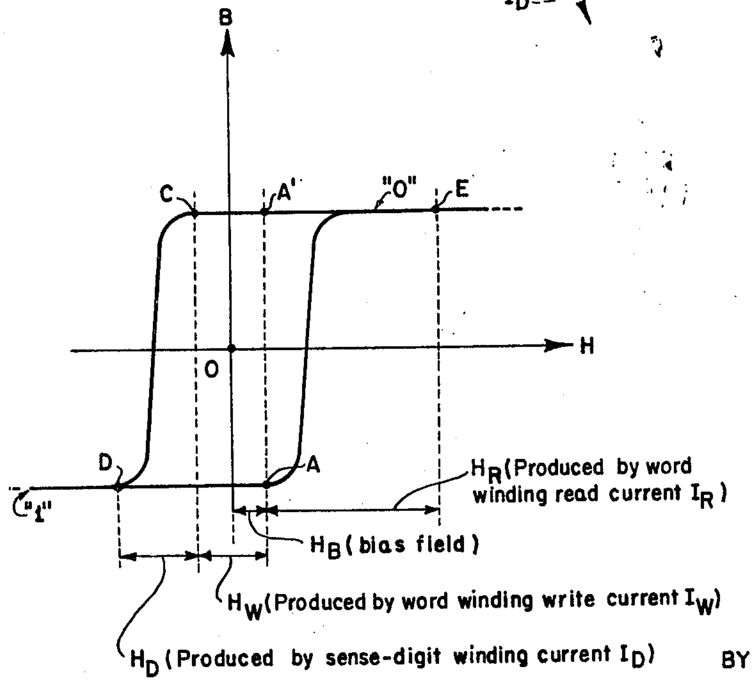
FIG. 3 is a graph illustrating the hysteresis characteristic of the thin film magnetic material provided on the rod of FIGS. 1 and 2.

However, before considering the three-dimensional matrix which is formed of rods and associated windings such as typically illustrated in FIG. 1, the mode of operation of the basic magnetic storage element (a plurality of which are provided on each rod) will first be considered with reference to FIGS. 2 and 3 along with FIG. 1. The typical basic magnetic storage element is the portion of the thin film magnetic coating 14 which is in the immediate vicinity of each of the word windings 21 to 29 shown in FIG. 1. Since each basic magnetic storage element is the same, it is sufficient for explanatory purposes to merely consider the magnetic film in the vicinity of word winding 21, which is the portion shown in FIG. 2. It will be understood that the magnetic film provided on the rod has a rectangular hysteresis characteristic, such as illustrated in FIG. 3, and an elemental portion thereof (such as the portion shown in FIG. 2) may be switched between its two states of saturation by the application thereto of suitable magnetic fields, such as produced by currents applied to its respective word winding 21 and/or sense-digit winding 11. As indicated in FIG. 3, the two saturation states of the basic storage element may arbitrarily be designated as "1" and "0." Then, as in conventional, "reading" of data stored in a magnetic element may be accomplished by driving the element to the "0" saturation state and observing whether an output pulse is induced in the sense-digit winding 11 as a result of switching—a "1" being indicated when an output pulse is produced, and a "0" being indicated when the output signal is absent. As is also conventional, "writing" is caused to take place immediately after "reading," the magnetic element being left in the "0" state in which it resides after "reading" of a "0" is to be stored, and being driven to the "1" state if a "1" is to be stored. With the above as background, the specific mode of operation employed in the typical embodiment being described herein will now be described in detail with reference to FIGS. 2 and 3.

As indicated in FIG. 3, in the absence of currents applied to the word winding 21 and the sense-digit winding 11 (that is, when $I_R$, $I_W$, and $I_D$ in FIG. 2 are all zero), an applied bias magnetic field $H_B$ causes the basic element to reside at either point A or point A′ in FIG. 3, depending upon whether the element is in the "1" or "0" state. This bias magnetic field $H_B$ is applied in the "0" (or read) direction with a magnitude of about ⅓ the field required for switching. Such a bias field $H_B$ can be provided in various ways, such as by an additional bias winding (not shown), or by subjecting the rod to an external bias field, the latter being the approach used in the present invention and will be considered later on in this description.

Considering the reading operation with reference to FIGS. 1 to 3, the mode of operation is such that reading is accomplished using only the bias field $H_B$ and the field $H_R$ produced by applying a suitable read current $I_R$ to the word line containing the word winding whose respective magnetic element is to be read out. The sense-digit winding 11 does not receive current during reading, its purpose being only to receive the induced pulse if the magnetic element switches. Thus, in FIG. 2, to read out the magnetic element associated with word winding 21, read current $I_R$ would be applied to word line 31, producing the read drive field $H_R$ in FIG. 3 which, in conjunction with the bias field $H_B$, is sufficient to drive the magnetic element into the "0" saturation state, as indicated at point E in FIG. 3. If the magnetic element is in the "1" state prior to reading (in which case it would be residing at point A in FIG. 3), the drive field $H_R$ drives the element from point A to point E in FIG. 3 so as to switch the element from "1" to "0," and thereby induce an output signal in the sense-digit line 11 to indicate the storage of a "1." If, on the other hand, the magnetic element is already in the "0" state prior to reading (in which case it would be residing at point A′ in FIG. 3), then it would merely be driven from point A′ to point E in the same "0" saturation state, so that no output signal (or negligible output signal) would be induced in the sense-digit winding 11 to indicate the storage of a "0." In order to speed up the time required for switching as well as to increase reliability, it is preferable, as indicated in FIG. 3, to choose the value of the current $I_R$ applied to the word line so that a drive field $H_R$ is produced which is significantly in excess of the minimum required for switching. This can safely be done since, as will become evident hereinafter, the organization of the memory matrix using rods such as illustrated in FIG. 1 employs linear selection for selecting word lines so that sufficiently large read currents $I_R$ can be applied to the selected word line without causing switching of unselected magnetic elements.

From the foregoing explanation of the reading operation, it will be understood that after reading, the magnetic element will reside in the "0" state at point A′ in FIG. 3 regardless of whether it previously stored a "1" and "0." Operation is thus of the destructive readout type since, as a result of reading, the information contained in the magnetic element is lost. Writing of the previous information back into the magnetic element, or the writing of new information, is then caused to occur immediately following the reading operation, as to typical in most destructive readout magnetic memories. Writing is accomplished by applying a write current $I_w$ to the same word line which was selected during the reading operation (which is word line 31 in FIG. 2). The write current $I_w$ flowing through word winding 21 produces the magnetic field $H_W$ indicated in FIG. 3, which drives the magnetic element from point A′ in FIG. 3 to point C, about ⅓ of the way towards the "1" state, but still not sufficient by itself to change the state of the element. If a "1" is to be written, the additional magnetic field required to switch the element is provided by applying a digit current $I_D$ to the sense-digit winding 11 (as indicated in FIG. 2) to drive the magnetic element the remaining ⅔ of the way to the "1" state, as indicated at point D in FIG. 3. If, on the other hand, a "0" is to be written into the magnetic element, no digit current is applied to the sense-digit winding 11. As a result, the magnetic element is driven only to point C by the field $H_W$ produced by write current $I_W$, and the element remains in the "0" state after writing is completed to thereby store a "0." From the foregoing it will be understood that during the typical writing operation being considered, the write current $I_W$ is always applied to the selected word line following a reading operation, but the digit current $I_D$ is applied to the sense-digit winding 11 only if a "1" is to be written.

The manner in which the above described mode of operation fits in with the overall rod memory organization will be considered later on in this description when the entire three-dimensional memory is considered. However, before leaving the description of the basic rod and its mode of operation, an important feature of the particular embodiment of the rod illustrated in FIGS. 1 and 2 will first be considered. It will be remembered that the sense-digit winding 11 is continuous along the rod 10 so that digit current $I_D$ (which is provided during writing if a "1" is to be written) flows continuously along the winding to lead 11$b$ (FIG. 1) and is returned to the front of the rod by way of the inner conductive substrate 12, as indicated in both FIGS. 1 and 2, the digit current then being passed on to the sense-digit windings and substrates of other rods by way of lead 12$a$ soldered to the inner substrate 12 at solder joint 12$b$. Such a construction has a number of important advantages. First, the use of the inner conductive substrate 12 as a return path is quite advantageous in that it reduces the necessity of providing an additional return winding, thereby greatly simplifying the construction and arrangement of such rods in a matrix. In addition, since the digit current $I_D$ flows through the inner substrate 12, a transverse field is produced (that is, a circular magnetic field emanating from substrate 12) which is in addition to the axial field produced by the pitch of the sense-digit winding 11. This transverse field is, of course, less than the anisotropy field, but has the advantageous effect of reducing the amount of axial field that would ordinarily be required, and thereby permits the use of a considerably smaller digit current $I_D$ during the writing operation, which may typically be as much as 25% smaller.

A still further and perhaps the most important advantage of causing digit current to flow in the inner conductive substrate 12 is that the circular or transverse magnetic field produced thereby acts to cancel the circular magnetic field produced around the rod by the pitch of the sense-digit winding 11. As a result, there will be no external circular magnetic field to couple to adjacent rods, which is important since the spacing between rods in the rod matrix can now be greatly decreased so as to achieve a high packing density.

At this point it may also be noted that not only is coupling due to circular magnetic fields practically eliminated, but also, because of the relatively small diameter of the rods (that is, of the order of .010 inch), the problem of axial field coupling between adjacent rods is also very greatly reduced, since the cross-sectional area of each rod is so small that it will not couple enough of the external field produced by the solenoid of an adjacent rod to have any significant effect. Thus, it will be appreciated that the rod construction illustrated in FIGS. 1 and 2 greatly reduces noise produced as a result of coupling between adjacent rods, the small diameter of the rod reducing axial field effects, and the return path for the digit current through the conductive substrate 12 reducing circular field effects.

It is to be noted that while the use of the inner conductive substrate 12 for a return line in FIGS. 1 and 2 has been exemplified with respect to the sense-digit winding 11, this type of rod construction can also be used to advantage with other types of windings and driving arrangements. For example, if the word windings were connected in series along the length of the rod 14 in FIG. 1, the conductive substrate 12 could be used for the return path, just as it is for the sense-digit winding 11 in FIG. 1. It is also to be noted that the sense-digit line need not be a continuous winding as indicated in FIGS. 1 and 2, but could also comprise a plurality of spaced windings connected in series and located below their respective word windings. In any case, for the purposes of this description and the appended claims the phrase "a plurality of series-connected windings" will be used to refer either to a continuous sense-digit winding as shown in FIGS. 1 and 2, or a series-connected plurality of spaced windings.

Figure 4:
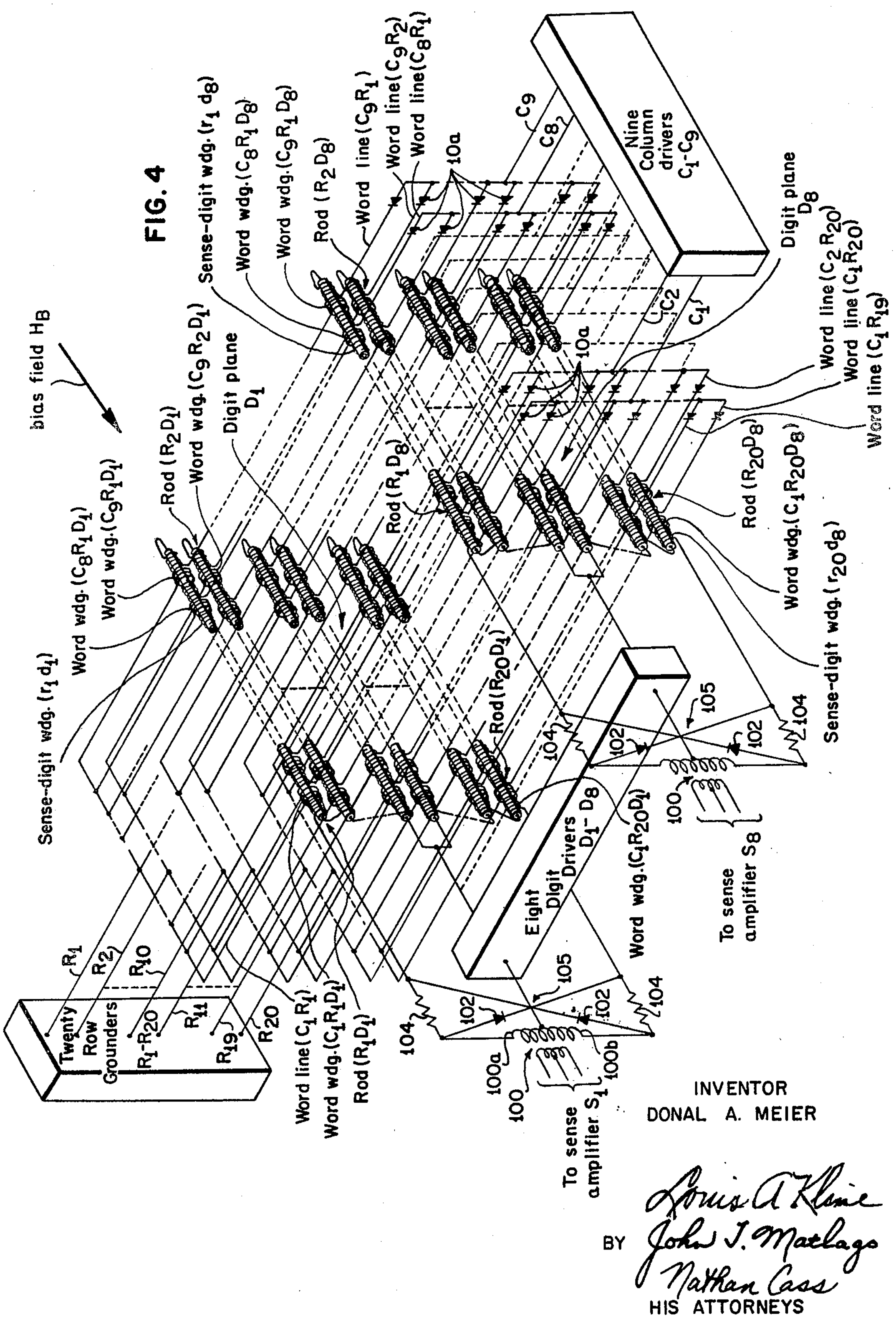
FIG. 4 is a fragmentary perspective view illustrating how the rods of FIGS. 1 and 2 are arranged in a three-dimensional matrix array.

Having described a typical rod, its associated windings, and its basic mode of operation with reference to FIGS. 1 to 3, the overall three-dimensional array employing a plurality of such rods will next be considered with reference to FIG. 4 which is a perspective fragmentary view thereof. Thus, referring to FIG. 4, the rods are arranged so as to form a rectangular three-dimensional matrix comprised of eight vertical planes of rods with twenty rods being provided in each plane. In order not to confuse the figure, only rods in the extreme left and right hand vertical planes of the matrix are shown in FIG. 4, and of these, only the top two rods, the middle two rods, and the bottom two rods are shown. However, from this showing in FIG. 4 the overall arrangement will readily be understood. The memory organization is such that 8-digit words are stored in the matrix along lines perpendicular to the rod axes. As is well known, a word in computer technology merely represents a convenient number of binary digits which are grouped together. As a result of such an organization of words in the matrix, the vertical planes in FIG. 4 may be designated as digit planes, the extreme left and right planes in FIG. 4 being designated digit plane $D_1$ and digit plane $D_8$, respectively. The term digit plane is used for these vertical planes, since this word organization causes each vertical plane to store the same corresponding digit for all words in the array. For example, each of the magnetic elements of rods located in digit plane $D_1$ will store the first digit of a respective 8-digit word in the array, while each of the magnetic elements of rods located in digit plane $D_8$ will store the eight (or last) digit of a respective 8-digit word.

Before proceeding further with the description of the matrix of FIG. 4, the nomenclature employed therein will be explained to aid in the description to follow. Considering the rod designations, each rod is designated by the letters R and D having subscripts which represent the row and digit plane, respectively, in which the rod is located, a row being considered as including all rods which are in the same horiozntal plane, as seen in FIG. 4. For example, the rod in the first row of digit plane $D_1$ is designated rod ($R_1D_1$), the rod in the last (twentieth) row of digit plane $D_8$ is designated rod ($R_{20}D_8$), and so on.

Considering the sense-digit winding next, since each is individual to a respective rod, it is given the same designation as the rod, but using the lower case letters $r$ and $d$. Thus, the sense-digit winding on rod ($R_1D_1$) which is in the first row of digit plane $D_1$ is similarly designated as sense-digit winding ($r_1d_1$).

Finally, considering the nomenclature used for the nine word windings on each rod, each word winding is designated by the three letters C, R and D with appropriate subscripts. The R and D letters of each word winding designation represent the particular rod on which the winding is wound, and thus are given the same subscripts as the rod. The C letter of the word winding designation represents which of the nine possible column positions on the rod that the word winding is located, there being nine word windings on each rod and, thus, nine possible word winding column positions. All windings having the same position on their respective rods are considered as being in the same column (numbered $C_1$ to $C_9$ from front to back in the matrix in FIG. 4) and the C letter of each word winding designation is therefore provided with a subscript which is numbered in accordance with the column position thereof. For example, the first word winding of the first rod in digit plane $D_1$ will be referred to as word winding ($C_1R_1D_1$), the letters $R_1D_1$ indicating that the word winding is on rod ($R_1D_1$) and the letter $C_1$ indicating that the word widing is in column $C_1$. It is to be noted in FIG. 4 that the nine columns of word windings $C_1$ to $C_9$ form planes which are perpendicular to both the eight digit planes $D_1$ to $D_8$ and the twenty row planes $R_1$ to $R_{20}$.

Having explained how the rods, sense-digit windings and word windings in the thin film rod matrix of FIG. 4 are designated, the manner in which the various windings are connected and driven will now be described. Considering the word windings first, it will be seen from FIG. 4 that each group of eight word windings (corresponding to a respective word stored in the matrix) which are located in both the same row and column are connected in series by a respective word line, the word line being designated by the letters R and C with subscripts which represent the particular row and column to which the word line corresponds. For example, the group of eight word windings ($C_1R_1D_1$), ($C_1R_1D_2$)—($C_1R_1D_8$) in column $C_1$ and row $R_1$ are all connected in series by word line $C_1R_1$, and the eight magnetic elements respectively associated therewith may be considered to constitute a memory cell for the storage of an 8-digit word in the matrix at that column-row location. The address of the word cell may conveniently be designated in accordance with its column-row location in the matrix, and this is done using the lower case letters *c* and *r*. Thus, the address of the cell constituted by the magnetic elements associated with word windings $C_1R_1D_1$ to $C_1R_1D_8$ will be designated word cell ($c_1r_1$). Since there are nine columns $C_1$ to $C_9$ and twenty rows $R_1$ to $R_{20}$ in the exemplary matrix of FIG. 4, the total storage capacity is 180 words, each word being eight digits long in correspondence with the eight digit planes $D_1$ to $D_8$.

Still referring to the matrix of FIG. 4, it will be seen that the ends of the word lines at the left side of the matrix (as seen in FIG. 4) are connected together to form twenty rows which are in turn respectively connected to row grounders $R_1$ to $R_{20}$, the grounding lines from these row grounders each being designated in accordance with the row grounders to which it corresponds. The other ends of the word lines at the right side of the matrix are connected together through respective diodes 10*a* to form nine columns $C_1$ to $C_9$ which are in turn respectively connected to nine column drivers $C_1$ to $C_9$ and, as for the row grounding lines, the column drive lines are also each designated in accordance with the column driver to which it corresponds. It will be understood that such a connection of windings is in accordance with the well known linear selection approach to memory organization in which current can be caused to flow in a single selected word line by activating a particular one of the column drivers $C_1$ to $C_9$ and a particular one of the row grounders $R_1$ to $R_{20}$. For example, activation of column driver $C_2$ and row grounder $R_8$ results in the selection of word line ($C_2R_8$), since only this line will have a completed path (through respective diode 10*a*, column driver $C_2$ and row grounder $R_8$) for the flow of current therethrough. As is also well known with regard to linear selection systems, respective diodes 10*a* are provided in each word line in order to prevent sneak currents from flowing in unselected lines. It should thus be evident that in order to provide the read and write currents $I_R$ and $I_W$ required for the mode of operation previously described in connection with FIGS. 2 and 3, it is merely necessary to design the column drivers and row grounders so as to be capable of supplying the desired respective read and write currents $I_R$ and $I_W$, and then to suitably activate, during appropriate read and write periods, the particular column driver and row grounder which correspond to the column-row of the cell in the matrix which is to be accessed.

Considering now the connection of the sense-digit lines in the matrix of FIG. 4, it will be remembered, as previously described in connection with FIG. 1, that the sense-digit winding 11 of each rod is wound continuously along the rod until it reaches the back end thereof, where lead 11*b* thereof is soldered to the inner conductive substrate 12 to permit digit current to flow therethrough and return to the front of the rod, a lead 12*b* being soldered at the front end of the substrate to permit connection to other sense-digit windings. As shown in FIG. 4, eight digit drivers $D_1$ to $D_8$ are provided, one for each digit plane, in order to provide for digit current flow in the event that a "1" is to be stored in the selected magnetic element of each digit plane during the writing operation. The manner of connection of the sense-digit windings and substrates of rods in the same digit plane is such that, in each digit plane, the sense-digit windings and substrates of the top ten rods are connected in series across the respective digit driver by way of the top winding 100*a* of transformer 100 and, in a like manner, the sense-digit windings of the bottom ten rods are connected in series across the respective digit driver by way of the bottom winding 100*b* of transformer 100. Thus, in each digit plane, the ten series-connected top sense-digit windings and substrates form one series circuit, and the bottom ten series-connected sense-digit windings and substrates form another series circuit, the two series circuits so formed being connected in parallel with respect to the digit driver of the digit plane by way of a respective winding of transformer 100, the transformer windings 100*a* and 100*b* serving as inputs to a respective digit plane sense amplifier, as will be considered, hereinafter. For example, in digit plane $D_1$, the sense-digit windings ($r_1d_1$) to ($r_{10}d_1$) of the top ten rods ($R_1D_1$) to ($R_{10}D_1$) are connected in series, as are the sense-digit windings ($r_{11}d_1$) to ($r_{20}d_1$) of the bottom ten rods ($R_{11}D_1$) to ($R_{20}D_1$) and each of the two resulting series circuits is connected across digit driver $D_1$ by way of a respective winding of transformer 100. Such a connection of sense-digit windings and substrates in each digit plane is provided in order to obtain common mode rejection for noise cancellation purposes, as will be considered further on in this description. As will also be considered, hereinafter, a digit noise cancelling bridge network 105 formed of diodes 102 and resistors 104 serves during digit current flow to prevent varying information patterns of the magnetic elements of the top and bottom halves of the digit plane from producing unbalanced signals which would over drive the sense amplifier and introduce recovery time problems that could limit the operating frequency of the memory.

Figure 5:
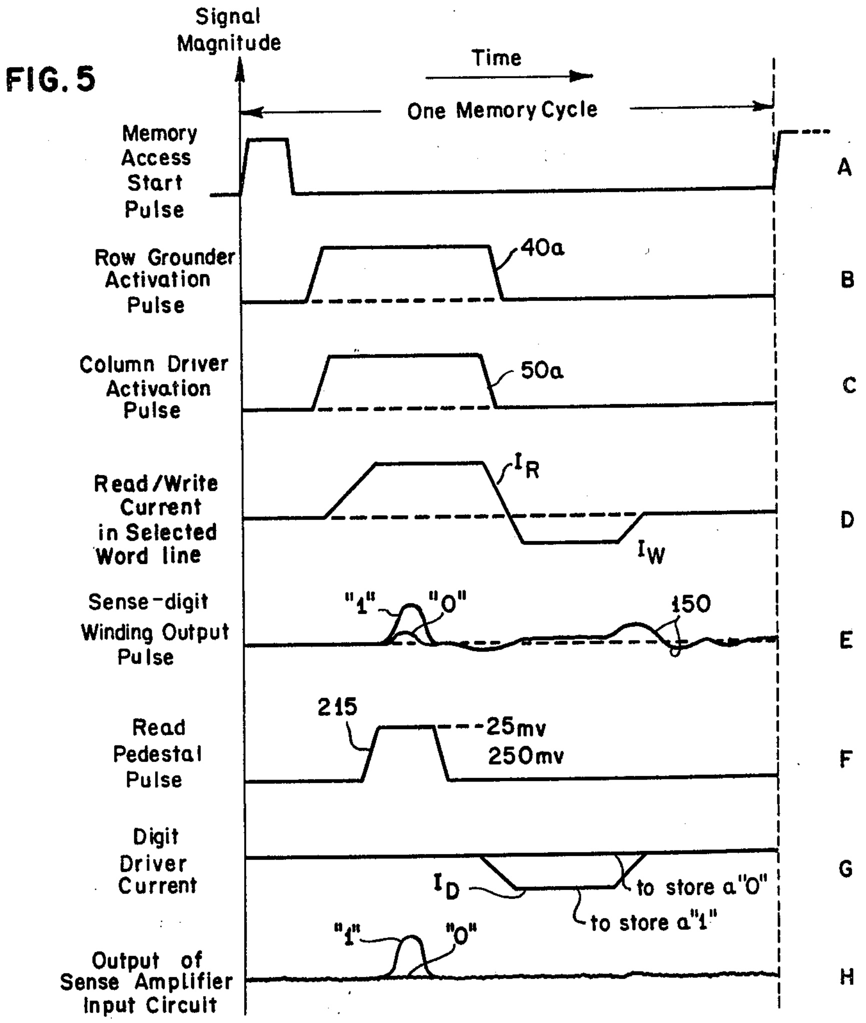
FIG. 5 is a series of graphs which will be used in explaining the operation of the invention.

The manner in which the above described matrix organization fits in with the earlier described mode of operation of a magnetic element will now be considered with reference to FIGS. 2 to 4 and the graphs of FIG. 5. In this connection, it should be understood that the particular physical arrangement of the rods and windings illustrated in the matrix of FIG. 4 can be modified, the important factor being the functional arrangement of the matrix with respect to the electrical operation to be provided. Reviewing, briefly, the previously described mode of operation, it will be remembered that during reading, read current $I_R$ is caused to flow in the selected word line by activating the particular column driver and row grounder which correspond to the column-row address in the matrix of the word cell which is to be accessed. Since a continuous axial bias field $H_B$ of the order of ⅓ of the field required for switching is continuously applied to the matrix in the read direction, the read current $I_R$ need only supply the remaining ⅔ field. However, as indicated in FIG. 3, the read current $I_R$ is chosen so that a significantly greater field $H_R$ is produced during reading, which is advantageous because it results in a faster switching time. This greater read current can be provided in the matrix of FIG. 4, since all the magnetic elements of a word cell are always read out during reading, and the use of a linear selection approach causes the read current $I_R$ to flow only in the selected word line. Consequently, during reading of the magnetic elements in the selected word cell, all other magnetic elements of unselected word cells remain undisturbed.

In FIG. 5, graph A illustrates a typical memory access start pulse which may occur in a computer (not shown) in which the memory matrix of FIG. 4 may be employed. During such a start pulse, the computer performs various preparatory operations, such as setting up the address of the word cell in the matrix which is to be accessed, clearing the flip-flops which are to receive the data read out, preparing the data which is to be written into the accessed cell, etc. After these preliminary operations are completed, the computer may then provide suitable activation pulses, such as illustrated in graphs B and C in FIG. 5 to activate the particular column driver and row grounder which correspond to the address of the matrix word cell to be accessed. A typical resulting read current $I_R$ flowing in the word windings of a selected word cell is illustrated in graph D and, as described previously in connection with FIGS. 2 and 3, serves to drive the magnetic elements of the selected word cell to the "0" state. Typical signals induced in the sense-digit windings during reading are illustrated in graph E of FIG. 5, the signal designated "1" representing the output pulse induced in a respective sense-digit winding when a magnetic element stores a "1," and the signal designated "0" representing the much smaller pulse induced in the respective sense-digit winding when a magnetic element stores a "0."

Since the matrix organization is such that only one magnetic element can ever be switched in each digit plane, only a single sense amplifier is required per digit plane, the sense amplifier serving to discriminate the "1" and "0" output pulses induced in the sense-digit line and, in response thereto, to make available to the computer suitable signals representative thereof. It will be understood that because the rod construction permits the sense-digit winding to have many turns, a relatively large amplitude "1" output pulse is produced which simplifies discrimination between such "1" output pulses and noise signals. It will also be understood that because the sense-digit windings are connected to each other and to the sense amplifier in common mode rejection fashion, capacitive-type noise resulting from electrostatic coupling between word windings and sense-digit lines will be essentially cancelled by input windings 100*a* and 100*b* of transformer 100. In order to take full advantage of this common mode rejection, it is preferable to turn on the selected row grounder slightly before the selected column driver, and turn off the selected row grounder slightly after the selected column driver, as indicated in graphs B and C in FIG. 5.

Turning now to a consideration of the writing operation, it will be remembered from the previous discussion in connection with FIGS. 2 and 3 that writing follows immediately after reading, and that the same previously activated column driver and row grounder operate during writing to cause write current $I_W$ to flow in the same word line previously selected during reading. This write current $I_W$ drives each magnetic element of the selected word cell approximately ⅓ of the way to the "1" state (that is, to point C in FIG. 3), and since this is considerably less than the required switching field, each magnetic element will necessarily remain in the "0" state if no other magnetic field is applied, in which case, the magnetic element would indicate the storage of a "0" therein. Thus, to write a "0" in a magnetic element of the selected cell, its respective digit driver would be left unactivated (as indicated in graph G of FIG. 5) so that only the field produced by the write current $I_W$ will be present.

On the other hand, if a "1" is to be written into a magnetic element of the selected word cell, its respective digit driver is activated to cause a digit current $I_D$ to be concurrently applied thereto along with the write current $I_W$ (as indicated in graphs D and G of FIG. 5). Each such magnetic element in which a "1" is to be written will thus receive the remaining ⅔ drive field $H_D$ (FIG. 3) required to drive it to the "1" state so as to thereby store a "1" therein. It is to be noted that the ⅔ drive field $H_D$ provided by the digit current $I_D$ will not disturb the magnetic elements of unselected word cells which are coupled to the same sense-digit winding since no write current $I_W$ flows through such elements. Consequently, the ⅓ magnetic bias field $H_B$ in the read direction will subtract from the ⅔ digit field $H_D$ to provide a resultant field in the write direction which is still only ⅓ of the field required for switching.

Figure 6:
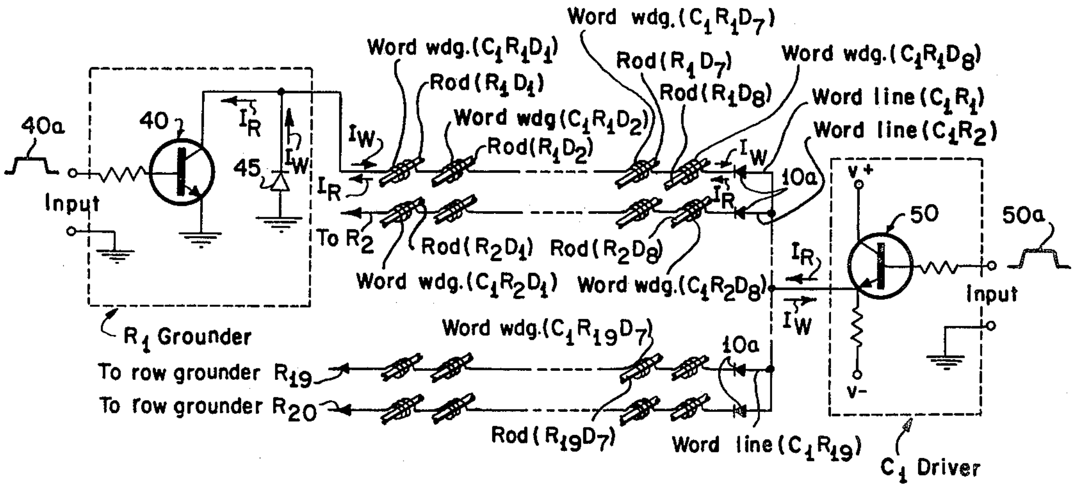
FIG. 6 is an electrical circuit diagram illustrating the operation of a typical row grounder and column driver in accessing the word windings of a particular matrix word cell of the matrix of FIG. 4.

Referring now to FIG. 6, a typical word plane of the matrix of FIG. 4 is illustrated, namely, the front word plane as seen in FIG. 4—that is, the word plane containing those word cells ($c_1r_1$) to ($c_1r_{20}$) whose word lines $C_1R_1$ to $C_1R_{20}$ are all connected to the first column driver $C_1$. A typical embodiment of this column driver $C_1$ is shown in FIG. 6, as well as a typical embodiment of the row grounder $R_1$, it being understood that the other column drivers and row grounders may be similarly constructed. The sense-digit lines have been omitted in FIG. 6 for the sake of clarity.

For the description of FIG. 6 it will be assumed that word cell ($c_1r_1$) is to be accessed which is the one located in column $C_1$ and row $R_1$ of the matrix. Therefore, to access this word cell, row grounder $R_1$ and column driver $C_1$ are activated by the computer to provide the required read and writer currents $I_R$ and $I_W$ through word line ($R_1R_1$) during respective reading and writing operations. To understand how this may typically be accomplished row grounder $R_1$ and column driver $C_1$ will be considered in more detail. Row grounder $R_1$ will be seen to comprise an NPN transistor 40 having its emitter grounded, its collector connected to word line ($C_1R_1$), and its base connected to receive an activation signal, such as the signal 40*a* in graph B of FIG. 5, through a suitable base resistor. The transistor 40 normally resides at cut-off, and when activated becomes saturated so as to effectively ground the left side of all the word lines in row $R_1$ (that is, word lines $C_1R_1$ to $C_9R_1$ in FIG. 4), includnig word line ($C_1R_1$) which for the description of FIG. 6 is assumed as the line to be selected.

Column driver $C_1$ in FIG. 6 will be seen to comprise an NPN transistor 50 having its collector connected to a positive voltage source V+, and its emitter connected to a negative voltage source V− through an appropriate emitter resistor. Like the row grounder transistor 40, the column driver transistor 50 is normally cut off, and when activated by the signal 50*a* shortly after the row grounder transistor 40 (as shown in graphs B and C of FIG. 5), a current path is completed through the selected word line ($C_1R_1$). As a result, read current $I_R$ flows (as indicated in FIG. 6) from column driver $C_1$, through respective diode 10*a*, through word line ($C_1R_1$) and then through the emitter and collector of row grounder $R_1$ transistor 40 to circuit ground. Since current paths through all other word lines in the array are open, either because of an unactivated column driver or an unactivated row grounder, read current $I_R$ flows only through the selected word line ($C_1R_1$), the diodes 10*a* preventing the flow of "sneak' currents through other word lines.

Having described how read current $I_R$ is applied to the selected word line ($C_1R_1$) by activation of row grounder $R_1$ and column driver $C_1$, it will now be explained how the appropriate write current $I_W$ is provided during the write operation following thereafter. As mentioned previously, a respective diode 10*a* is employed in each word line to prevent sneak currents from flowing through unselected lines. This expediency is well known in linear selection systems. It is also known that diodes 10*a* may be chosen to have a relatively slow recovery time so that the minority carrier storage produced within the diode of the selected word line during reading may be used to obtain automatic writing in the same selected word cell as was accessed during reading, in a manner similar to a biased switch core. More specifically, it will be understood that by using an appropriate semiconductor diode for the diode 10*a* which has a slow recovery time, the minority carriers stored in the base of the diode 10*a* of the selected word line ($C_1R_1$) during reading will produce a reverse current (that is, a current in the write direction), if the selected word line is reverse-biased during writing. Where the memory cycle is very fast of the order of 200 nanoseconds, as is typical for the thin film rod memory being considered herein, such a diode can advantageously be selected so as to have a recovery time commensurate with the period required for writing. Once this is done, it is merely necessary to choose the V— voltage source and the emitter resistor of the transistor 50 in FIG. 6 to provide a suitable reevrse bias which will produce the desired flow of write current $I_W$ through word line ($C_1R_1$) following reading, as indicated in FIG. 6 and in graph D of FIG. 5. The diode 45 is provided across transistor 40 of row grounder $R_1$ to provide a path for the flow of write current $L_W$, since row grounder $R_1$ is cut off during writing.

Figure 7:
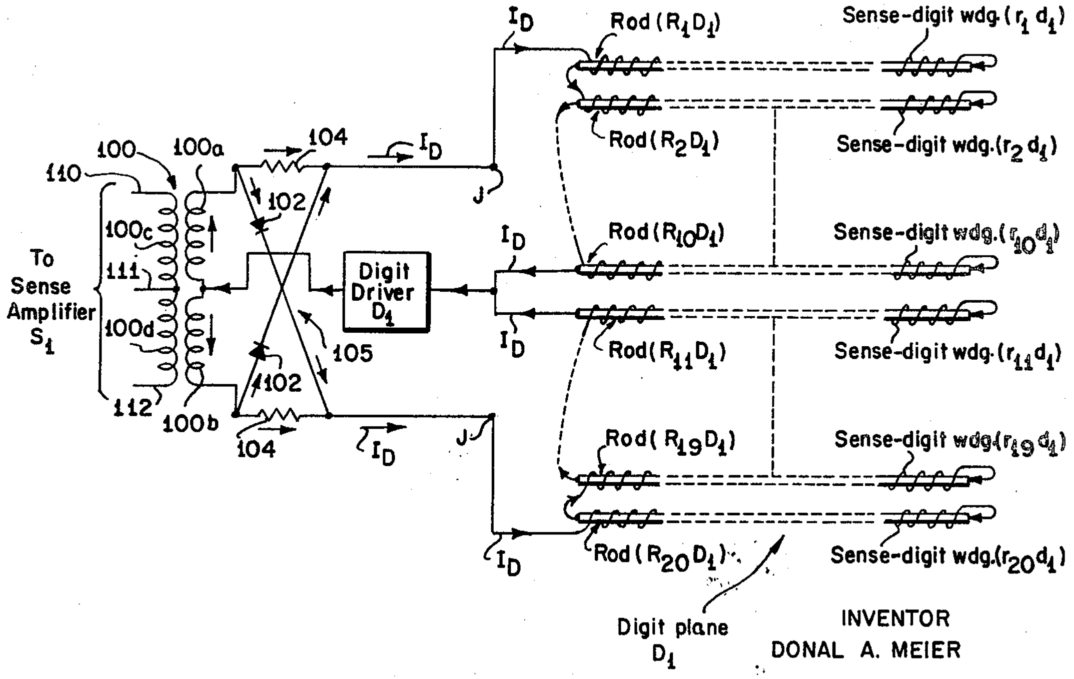
FIG. 7 is an electrical circuit diagram illustrating the connection and operation of the sense-digit windings in a typical digit plane in the matrix of FIG. 4.

Reference is now directed to FIG. 7 which shows a typical digit plane $D_1$ along with its associated digit driver $D_1$, and its associated digit noise cancelling bridge network 105. The word windings on the rods have been omitted for greater clarity. The chief purpose of FIG. 7 is to explain how this digit noise cancelling bridge network 105 operates to prevent overdriving the sense amplifier during the flow of digit current as a result of varying information patterns in the top and bottom halves of each digit plane. It will be remembered that by series-connecting the digit-sense windings and substrates of the top ten rods in each digit plane to form a first series-connected circuit, and series-connecting the sense-digit windings and substrates of the bottom ten rods in each digit plane to form a second series-connected circuit, and ten connecting each such series-connected circuit across the digit plane driver ($D_1$ in FIG. 7) by way of a respective winding 100*a* or 100*b* of transformer 100, the resulting symmetry provides common mode rejection for noise effects occurring in a like manner in each series connected circuit. Such common mode rejection not only serves during reading, as pointed out previously, but also serves during writing to cancel out the voltages produced across the two series-connected digit windings and substrates (that is, across J—J in FIG. 7) as a result of the flow of digit current flow therethrough. Such cancellation is important from the viewpoint of the sense amplifier, even though the sense amplifier is not needed during writing, since noise voltages appearing across points J—J can saturate the sense amplifier and prevents its recovering in time for the reading operation of the next memory cycle.

Since the digit current $I_D$ divides between the two series-connected circuits formed from the top and bottom sense-digit windings, if the two series-connected circuits have identical impedances, the voltages appearing at points J—J in FIG. 7 will provide perfect common mode cancellation. However, because the information pattern stored in the magnetic elements on the top and bottom rods may vary, one series-connected circuit may have a different impedance than the other so as to cause a voltage unbalance across points J—J, which will be applied to the digit plane sense amplifier. While the sense amplifier recovery time with such an unbalance may not be a problem in conventional memories having low repetition rates, it is very serious in memories where a high repetition rate is required, and the art is continually trying to increase memory repetition rate capability. It is an important feature of the present invention, therefore, to provide means, in addition to common mode rejection, which will automatically reduce the voltage unbalance applied to the digit plane sense amplifier during digit current flow as a result of varying information content in the two halves of the digit plane. Obviously, any such means has the further requirement that it must not interfere with the operation of the sense amplifier during reading. Such means are provided in the present invention in a remarkably simple manner using the bridge network 105 illustrated in FIG. 7 for the digit plane $D_1$, it being understood that each of the other digit planes may be provided with a similar bridge network. As shown in FIG. 7, the diodes 102 and resistors 104 are connected to form a bridge with respect to the two series-connected sense-digit windings of the digit plane so that whenever digit current flow produces an unbalance across points J—J, diodes 102 will permit the digit currents flowing in each series-connected circuit to adjust by the amount required to eliminate this voltage unbalance. Slight differences between the digit currents flowing in the top and bottom sense-digit windings will, of course, occur but in the usual case, these differences will be so small as to be well within the tolerances of the thin film magnetic material characteristics.

It is to be noted with respect to the bridge network 105 of FIG. 7 that, as with most diodes, the high forward conductivity of diodes 102 will not be maintained below the diode threshold voltage. This threshold voltage will, thus, determine the maximum voltage unbalance which the bridge 105 will permit across points J—J, and must be high enough so that a "1" output pulse induced in a sense-digit winding during reading will pass to the sense amplifier. Typically, therefore, the threshold voltage of diodes 102 may be chosen of the order of 250 millivolts, which is larger than the "1" output pulse amplitude, but small enough so that the maximum unbalance voltage of 250 millivolts which can then appear across points J—J will permit the sense amplifier to recover in time for the reading operation of the next memory cycle. The values of resistors 104 of the bridge network 105 are also chosen as a compromise between two values, the magnitudes of resistors 104 being sufficiently large to handle digit plane voltage unbalance during writing without causing significant differences in the digit currents flowing in each half of the digit plane, yet being sufficiently small so as not to significantly attenuate a "1" output pulse occurring during reading. The success of the bridge network 105 in preventing digit noise across points J—J in FIG. 7 is illustrated in graph E of FIG. 5 by the relatively low amplitude signals 150 applied to the sense amplifier as a result of digit current flow during writing. Without the bridge network 105, these digit noise signals 150 would be of the order of 10 times larger.

Having considered the construction and operation of the thin film memory matrix of FIG. 4, the next area of consideration will be the sense amplifier provided in each digit plane. From the foregoing it will be evident that the function of each digit plane sense amplifier is to detect a "1" output pulse occurring in a sense-digit winding of its respective digit plane, while discriminating against "0" output pulses and other noise signals. In addition, the sense amplifier must also be able to recover after the writing operation is completed in sufficient time for the next reading operation. The manner in which an appropriate sense amplifier is provided in the present invention will now be considered in detail with reference to FIGS. 8 and 9.

Figure 8:
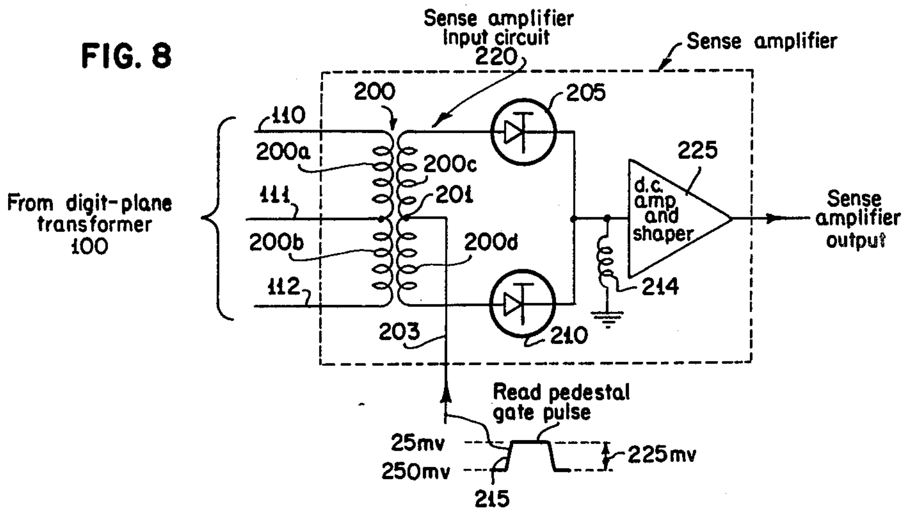
FIG. 8 is an electrical circuit diagram illustrating a typical digit plane sense amplifier.
Figure 9:
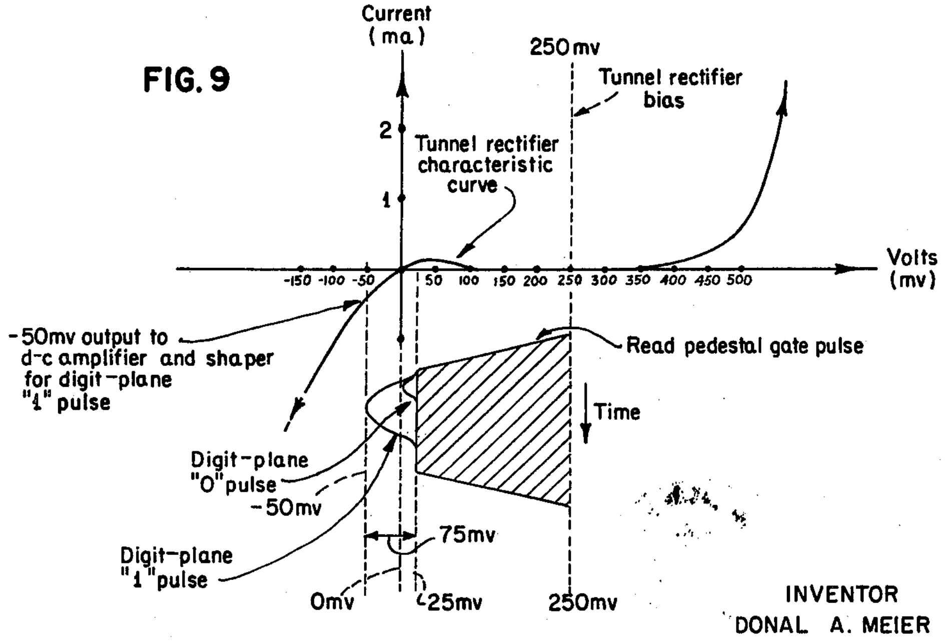
FIG. 9 is a graph which will be used in explaining the operation of the sense amplifier of FIG. 8.

Thus, referring to FIGS. 8 and 9, a typical digit plane sense amplifier in accordance with the invention is illustrated. The output windings 100*c* and 100*d* from transformer 100 (FIG. 7) are coupled by leads 110, 111 and 112 to input windings 200*a* and 200*b* of transformer 200 of the sense amplifier, one side of each of the output windings 200*c* and 200*d* being connected together to form junction 201. Lead 203 is connected to junction 201 for the purpose of permitting a read pedestal gate pulse 215, such as illustrated in graph F of FIG. 5, to be applied thereto for activating the sense amplifier, as will shortly be explained. The other side of windings 200*c* and 200*d* are connected to the plates of tunnel rectifiers 205 and 210, respectively, the cathodes of tunnel rectifiers 205 and 210 being in turn connected to the input of D.C. amplifier and shaper 225, across which is connected the inductor 214. It is to be understood that the arrangement of the windings of transformers 100 (FIG. 7) and 200 (FIG. 8) is such that the same common mode rejection obtained across input windings 100*a* and 100*b* of transformer 100 is also obtained across output windings 200*c* and 200*d*.

The transformer 200, the tunnel rectifiers 205 and 210, and the inductor 214 may be considered to constitute the sense amplifier input circuit 220 indicated in FIG. 8.

The operation of the sense amplifier input circuit 220 illustrated in FIG. 8, will now be considered with reference to FIG. 9, the specific curves and voltages illustrated in FIG. 9 being merely illustrative. It will be understood that tunnel rectifiers 205 and 210 may each have the typical current vs. voltage characteristic curve illustrated in FIG. 9, and each may typically be provided with a forward bias of 250 millivolts by way of lead 203, in which case they will each reside in a high forward impedance region. As indicated in FIG. 9, this high forward impedance region extends from about 0 to almost 500 millivolts. Thus, with the tunnel rectifiers forwardly biased to 250 millivolts, any signals appearing in winding **200*c* or 200*d* which are less than ±250 millivolts will not drive the tunnel rectifiers out of their relatively high forward impedance region. Such input signals less than ±250 millivolts will, thus, be blocked from reaching the amplifier and shaper 225. Since the bridge network 105 provided across each digit plane, as indicated in FIG. 7, limits signals to about ±250 millivolts or less, it will be understood that the combination of this bridge network 105 with the sense amplifier input circuit 220 will advantageously prevent any matrix noise signals from reaching the D.C. amplifier and shaper 225. As a result, recovery problems in the D.C. amplifier and shaper 225** as a result of digit current flow are virtually eliminated.

In order to permit a "1" output pulse appearing in a digit plane during reading to be passed to the amplifier and shaper 225, the read pedestal pulse 215 is applied when a "1" output pulse is expected—that is, concurrently with the row grounder and column driver pulses **40*a* and 50*a*, as shown in graphs B, C and F of FIG. 5. As indicated in FIG. 9, the read pedestal pulse 215 acts to shift the bias of the tunnel rectifiers to 25 millivolts so that a "1" output pulse, which may typically be of the order of 75 millivolts, will drive a respective tunnel rectifier 205 or 210 into a region of relatively low impedance (as indicated in FIG. 9) so as to pass an output pulse of the order of −50 millivolts to the D.C. amplifier and shaper 225. Since, as pointed out previously, only one magnetic element at a time is ever selected for reading in any one digit plane, only one of the windings 200*c* or 200*d* will receive the "1" output pulse, depending upon which half of the digit plane that the selected magnetic element is located. Thus, only one of the tunnel rectifiers 205 or 210 is operated at a time to pass a "1" output pulse during a reading operation. The amplifier and shaper 225 operates in response to the −50 millivolt pulse passed thereto from either of the tunnel rectifiers 205 and 210 to provide a suitable output signal for use by the computer in which the memory is incorporated. The inductance 214 at the input of the D.C. amplifier and shaper 225 is chosen to be of sufficiently low D.C. impedance so that no D.C. restoration is required of a tunnel rectifier after passing the "1" output pulse. As a result, the input circuit 220 may be caused to typically recover within 50 nanoseconds after the fall of the read pedestal pulse 215**.

Graph H of FIG. 5 illustrates typical signals applied to the amplifier and shaper 225 by the sense amplifier input circuit 220 during reading and writing, and clearly shows the high degree of discrimination and the absence of noise provided thereby. A further advantage of the use of tunnel rectifiers in the sense amplifier input circuit 220 illustrated in FIG. 8 is that, besides the high discrimination provided thereby, the back slope of the tunnel rectifier voltage vs. current characteristic (that is, for negatively applied voltages) is very temperature-stable and thus can provide reliable detection over a wide temperature range.

Figure 10:
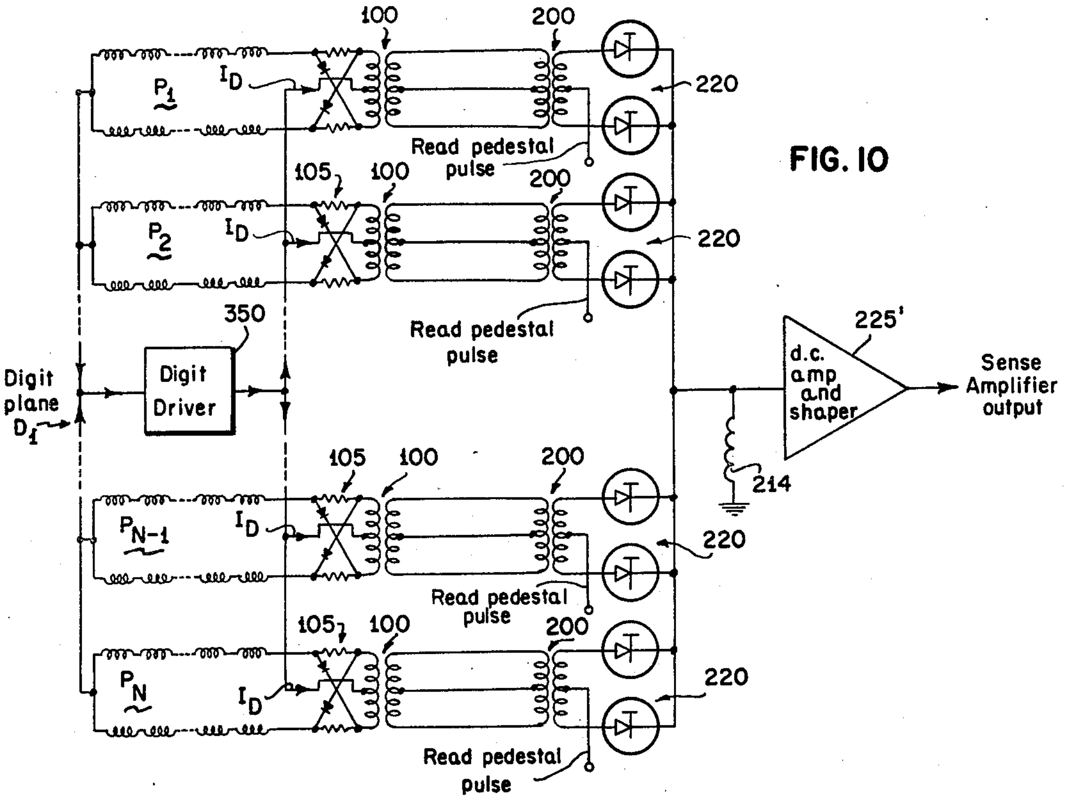
FIG. 10 is an electrical circuit diagram illustrating how the sense-digit windings of a digit plane in the array of FIG. 4 may be partitioned.

Because of the high order discrimination provided by the sense amplifier input circuit 220 illustrated in FIG. 8, it becomes possible to partition the various sense-digit windings into a greater number of series-connected circuits, rather than just the single pair of series-connected circuits illustrated in FIG. 7. Such an arrangement is highly advantageous when a digit plane incorporates a large number of magnetic elements, since it permits avoiding transmission delays which could interfere with high speed operation. FIG. 10 illustrates how the sense-digit windings in a digit plane may typically be partitioned into "N" pairs of series-connected sense-digit windings, the pairs being designated $P_1$ to $P_N$, and being fed by a common digit driver 350. Each pair includes a respective bridge circuit 105 and a respective sense amplifier input circuit 220 operating as described for the single pair in connection with FIGS. 7 and 8, the outputs of the sense amplifier inputs 220 being fed in parallel to a common D.C. amplifier and shaper 225'. Obviously, instead of using a single common digit driver, a separate digit driver could be provided for each pair, as illustrated for the single pair in FIG. 7.

Figure 11:
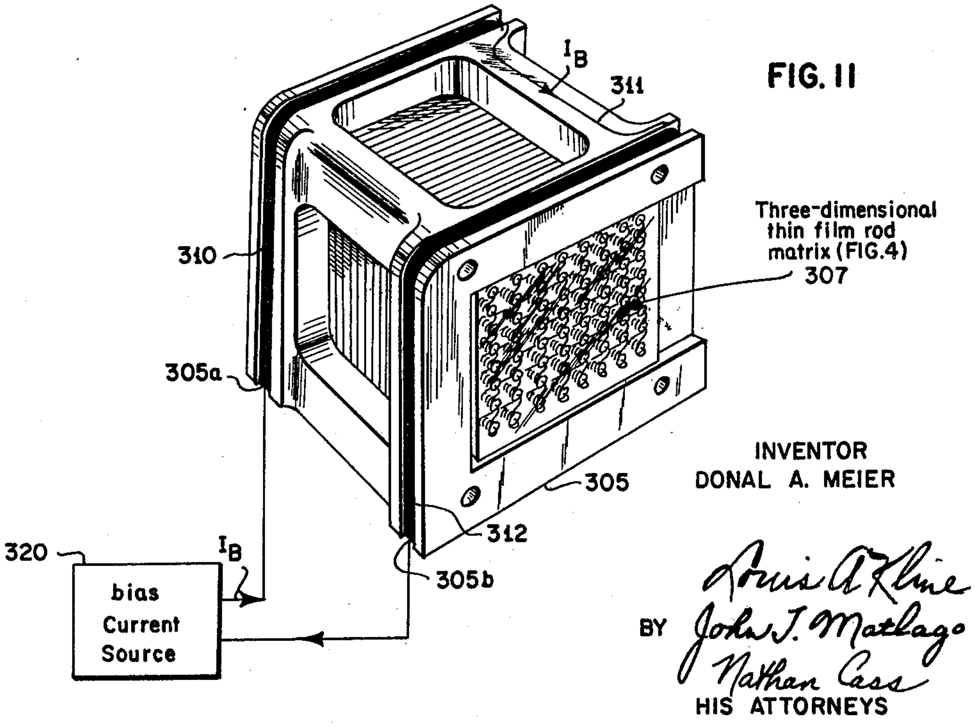
FIG. 11 is a perspective view illustrating how the matrix array of FIG. 4 may be disposed in an appropriate housing so as to have a bias magnetic field applied thereto.

The final figure to be considered is FIG. 11 which illustrates how the bias field $H_B$ (FIGS. 1 to 4) may typically be applied to the matrix of FIG. 4. The approach employed involves disposing the matrix 305 in a suitable housing 307 having grooves **305*a* and 305*b* therein. Helmholtz-type coils 310 and 312 are wound in grooves 305*a* and 305*b*, respectively, and are connected in series by lead 311 so that their magnetic fields are additive. A bias current source 320 connected across coils 310 and 312** produces a bias current $I_B$ therein of sufficient magnitude to provide the bias magnetic field $H_B$ indicated in FIG. 3.

While the foregoing disclosure has been primarily concerned with particular illustrative embodiments, it will be appreciated that the invention is not limited to the specific uses or to the specific constructional arrangements disclosed herein, and is to be considered as including all modifications and variations encompassed within the scope of the appended claims.

What is claimed is:

1. In a memory array, a plurality of bistable elements, first means coupling a first plurality of said elements, second means coupling a second plurality of said elements, sensing means having first and second inputs respectively coupled to said first and second means so as to achieve common mode noise rejection, a bridge network coupled to the first and second inputs of said sensing means, and signal source means coupled to said first and second means by way of said bridge network, said bridge network being constructed and arranged to control the portions of the signals applied to said first and second means from said signal source means so that signals appearing across said sensing means as a result of signals applied by said signal source means are substantially nullified despite differences in the impedance of said first and second means.

2. The invention in accordance with claim 1, wherein said bridge network comprises first and second impedances respectively connected in series with said first and second inputs of said sensing means, and first and second diodes connected between opposite ends of said impedances.

3. In a memory array, a plurality of bistable magnetic elements, first winding means coupling a first plurality of said elements, second winding means coupling a second plurality of said elements, sensing means having first and second inputs coupled to said first and second winding means so as to provide common mode rejection, a bridge network comprised of first and second impedances and first and second diodes arranged in bridge fashion with said diodes and said impedances in opposite branches, said first impedance being connected between the first input of said sensing means and one end of said first winding means, said second impedance being connected between the second input of said sensing means and one end of said second winding means, said first diode being connected between said first input of said sensing means and said one end of said second winding means, and said second diode being connected between said second input of said sensing means and said one end of said first winding means, and current source means coupled to said first and second winding means so as to apply currents thereto by way of the first and second inputs of said sensing means and said bridge network, and diodes and impedances of said bridge network being chosen so that signals applied to said sensing means as a result of current flow from said current source means through said first and second winding means are substantially nullified, despite differences in the information patterns stored by the elements coupled by said first and second winding means.

4. In a memory array, a plurality of magnetic rods functionally arranged in a plurality of digit planes, each rod having a thin film magnetic layer coated thereon and each including a solenoidal winding encircling the rod, sensing means having first and second inputs, means connecting the solenoidal windings of at least two rods in the same digit plane to said sensing means in common mode rejection fashion, a bridge network coupled to the first and second inputs of said sensing means, and signal source means coupled to the solenoid windings on said two rods by way of said bridge network, said bridge network being constructed and arranged to control the portions of the signals applied to the solenoid windings of said two rods so that signals which would appear across said sensing means as a result of signals applied by said signal source means are substantially nullified despite differences in the impedances of the solenoid windings of said two rods.

5. In a magnetic memory array, a plurality of magnetic rods functionally arranged in a plurality of digit planes, each rod being comprised of a conductive inner substrate having a thin film magnetic layer coated thereon and each including a plurality of series-connected solenoidal windings extending along the length of the rod, means connecting one free end of each of the series-connected solenoid windings of a first pair of rods in the same digit plane to its respective substrate, means connecting the other end of the substrate of one of said pair of rods to the other free end of the series-connected solenoid windings of the other of said pair of rods so that the series-connected solenoid windings and substrates are all in series to thereby form a first series circuit, means connecting the solenoid windings and substrates of a second pair of rods in the same digit plane and in the same series-connected manner as are the solenoid windings and substrates of said first pair to thereby form a second series circuit, sensing means having first and second inputs, means connecting said first and second series circuits to said sensing means in common mode rejection fashion, a bridge network coupled to the first and second inputs of said sensing means, and current source means coupled to said first and second series circuits by way of said bridge network and the first and second inputs of said sensing means, said bridge network being constructed and arranged to control the currents applied to said first and second series circuits so that signals which would be applied to said sensing means as a result of current flow to said first and second circuits are substantially nullified despite differences in the impedances thereof due to the storage of different information patterns therein.

6. The invention in accordance with claim 5, wherein said bridge network comprises first and second impedances respectively connected in series with said first and second inputs of said sensing means, and first and second diodes connected between opposite ends of said impedances.

7. In a memory system, a memory array providing output signals representative of data stored therein, and sensing means coupled to said array to receive output signals therefrom, said sensing means including an input circuit and an amplifier to which the output of said input circuit is fed, said input circuit comprising: first and second tunnel rectifiers having their cathodes coupled together, means biasing said rectifiers to a relatively high forward impedance region, means coupling the plates of said rectifiers so that an output signal from said memory array is applied with negative polarity to the plate of one of said rectifiers, and means applying a pedestal pulse to said rectifiers during the interval that an output pulse is expected from said array so as to temporarily reduce the forward bias thereon, the magnitude and polarity of said pedestal pulse being chosen so that an output pulse will drive the rectifier to which it is applied into a relatively low reverse impedance region so as to pass a significant portion of the output signal therethrough for application to said amplifier.

8. In a memory system, a memory array providing output signals representative of data stored therein, and sensing means coupled to said array to receive output signals therefrom, said sensing means including an input circuit and an amplifier to which said output signals are fed, said input circuit comprising: a transformer having center-tapped primary and secondary windings, means applying an output signal from said memory array with negative polarity between either side of the primary winding and its center-tap, first and second tunnel rectifiers having their plates coupled to respective sides of the secondary winding and their cathodes coupled to said amplifier, means biasing said rectifiers to a relatively high forward impedance region, means applying a pedestal pulse to said rectifiers by way of the center tap of the secondary winding during the interval when an output pulse is expected from said memory array, the magnitude and polarity of said pedestal pulse being chosen to momentarily change the forward bias applied to said tunnel rectifiers by an amount so that an output pulse from said memory will drive one of said rectifiers into a relatively low impedance region to permit a significant portion of the output signals to pass therethrough for application to said amplifier.

9. The invention in accordance with claim 8, wherein an inductance is connected across the input to said amplifier and chosen to have a magnitude so that no D.C. restoration is required to a tunnel rectifier after passing an output pulse.

10. In a memory system, a memory array providing output signals representative of data stored therein, and sensing means coupled to said array to receive output signals therefrom, said memory array comprising a plurality of bistable elements and having first and second means coupling respective first and second pluralities of said elements, said sensing means including first and second tunnel rectifiers each biased to a relatively high forward impedance region and having their cathodes coupled to said amplifier, said sensing means also including common mode rejection means coupling the plates of said rectifiers to said first and second means so that an output signal therefrom is applied to a respective one of said rectifiers with negative polarity while common mode signals are substantially nullified, said sensing means also including means for applying a pedestal pulse to said rectifiers during the interval that an output pulse is expected from said first and second means so as to temporarily change the forward bias thereon, the magnitude and polarity of said pedestal pulse being chosen so that an output pulse will drive the rectifier to which it is applied into a relatively low reverse impedance region so as to permit a significant portion of the output pulse to pass therethrough.

11. The invention in accordance with claim 10, wherein said memory array also includes a signal source and a bridge network through which said signal source is coupled to said first and second means, said bridge network being constructed and arranged to control the portions of the signals applied to said first and second means from said signal source so that signals which would be applied to said sensing means as a result of signals applied by said signal source are substantially nullified despite differences in the impedances of said first and second means caused by varying information storage patterns in the respective elements coupled thereby.

12. The invention in accordance with claim 11, wherein said bridge network comprises first and second impedances respectively connected in series with said first and second means, and first and second diodes connected between opposite ends of said impedances.

13. The invention in accordance with claim 12, wherein the threshold voltage of said diodes are chosen so as to have a magnitude approximately the same as said pedestal pulse.

14. In a memory system, a plurality of bistable elements, a first pair of means respectively coupling first and second pluralities of said elements and a second pair of means respectively coupling third and fourth pluralities of said elements, each pair having output pulses produced therein in response to data stored in the respective elements coupled thereby, sensing means including an amplifier and first and second input circuits coupled to the input of said amplifier, and means coupling each of the first and second pairs in common mode rejection fashion to said first and second input circuits respectively, each input circuit including first and second tunnel rectifiers and means cooperating therewith so that an output pulse from either of the respective pair coupled thereto is permitted to pass through the tunnel rectifier to said amplifier.

15. In a memory system, a plurality of bistable elements, means functionally arranging said elements in a plurality of digit planes so that only one element in a digit plane is read out during a reading interval, first, second, third and fourth means respectively coupling first, second, third and fourth pluralities of said elements so as to have output pulses produced therein in response to data stored in the respective elements coupled thereby, sensing means including an amplifier and first and second input circuits coupled to the input of said amplifier, and means coupling the pair comprised of said first and second means in common mode rejection fashion to said first input circuit and coupling the pair comprised of said third and fourth means in common mode rejection fashion to said second input circuits, each input circuit including first and second tunnel rectifiers having their cathodes coupled to said amplifier and their plates coupled to receive output signals with negative polarity, means biasing said rectifiers to a relatively high forward impedance region, and means applying a pedestal pulse to said rectifiers during the interval that an output pulse is expected so as to temporarily change the bias thereon, the magnitude and polarity of said pedestal pulse being chosen so that an output pulse will drive the rectifier to which it is applied into a relatively low reverse impedance region so as to permit a significant portion of the output to pass therethrough to said amplifier.

16. The invention in accordance with claim 15, wherein said bistable elements are formed of a plurality of rods, each rod having a thin film magnetic layer coated thereon, and wherein said first, second, third and fourth means are formed of multiple-turn solenoidal windings wound on said rods.

References Cited

UNITED STATES PATENTS

| | | | |
|---|---|---|---|
| 2,947,977 | 8/1960 | Bloch | 340—174 |
| 3,237,172 | 2/1966 | Gosslau et al. | 340—174 |

BERNARD KONICK, Primary Examiner

G. M. HOFFMAN, Assistant Examiner

U.S. Cl. X.R.

307—321, 323

UNITED STATES PATENT OFFICE

CERTIFICATE OF CORRECTION

Patent No. 3,478,338 November 11, 1969

Donal A. Meier

It is certified that error appears in the above identified patent and that said Letters Patent are hereby corrected as shown below:

Column 2, line 43, after "diameter" insert -- , but in any case, preferably less than 0.10 inch in diameter --. Column 4, line 48, "to" should read -- is --. Column 10, line 22, "($R_1R_1$)" should read -- ($C_1R_1$) --. Column 16, line 33, "tap" should read -- tape --.

Signed and sealed this 27th day of October 1970.

(SEAL)
Attest:

Edward M. Fletcher, Jr.
Attesting Officer

WILLIAM E. SCHUYLER, JR.
Commissioner of Patents